US011778153B2

(12) United States Patent
Ito et al.

(10) Patent No.: US 11,778,153 B2
(45) Date of Patent: Oct. 3, 2023

(54) IMAGING DEVICE, ELECTRONIC DEVICE, AND IMAGE GENERATION DEVICE

(71) Applicant: CANON KABUSHIKI KAISHA, Tokyo (JP)

(72) Inventors: Maasa Ito, Tokyo (JP); Tomoya Onishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/579,715

(22) Filed: Jan. 20, 2022

(65) Prior Publication Data

US 2022/0239879 A1    Jul. 28, 2022

(30) Foreign Application Priority Data

Jan. 26, 2021  (JP) ................. 2021-010625

(51) Int. Cl.
*H04N 9/68* (2023.01)
*H04N 9/64* (2023.01)
*H04N 23/10* (2023.01)
*H04N 23/76* (2023.01)
*H04N 23/741* (2023.01)

(52) U.S. Cl.
CPC ............... *H04N 9/68* (2013.01); *H04N 9/646* (2013.01); *H04N 23/10* (2023.01); *H04N 23/741* (2023.01); *H04N 23/76* (2023.01)

(58) Field of Classification Search
CPC ........ H04N 9/68; H04N 5/2355; H04N 5/243; H04N 9/045; H04N 9/646; H04N 23/10; H04N 23/76; H04N 23/741
See application file for complete search history.

(56) References Cited

U.S. PATENT DOCUMENTS

| 9,142,575 | B2 | 9/2015 | Kobayashi et al. |
| 9,894,308 | B2 | 2/2018 | Onishi et al. |
| 9,900,532 | B2 | 2/2018 | Takado et al. |
| 9,924,121 | B2 | 3/2018 | Onishi |
| 10,356,286 | B2 | 7/2019 | Ito et al. |
| 10,382,714 | B2 | 8/2019 | Michimata et al. |
| 10,972,694 | B2 | 4/2021 | Ito |
| 11,159,754 | B2 | 10/2021 | Ito |
| 11,189,649 | B2 | 11/2021 | Iwakura et al. |
| 2012/0287294 | A1* | 11/2012 | Kaizu ................. H04N 5/2355 348/E5.037 |
| 2016/0330414 | A1 | 11/2016 | Takado et al. |
| 2017/0310901 | A1* | 10/2017 | Sheikh ...................... G01S 3/00 |
| 2019/0075263 | A1* | 3/2019 | Mlinar ................... H04N 23/12 |

(Continued)

FOREIGN PATENT DOCUMENTS

JP    2003-259234 A    9/2003

*Primary Examiner* — Ahmed A Berhan
(74) *Attorney, Agent, or Firm* — Venable LLP

(57) ABSTRACT

An imaging device is provided. The device comprises: an imaging unit in which a plurality of pixels each including a photoelectric conversion element are arranged; a signal processor configured to process a signal output from the imaging unit; and a storage device configured to store the signal output from the imaging unit and transfer the signal to the signal processor. The storage device stores a plurality of image signals output by the plurality of pixels arranged in the imaging unit as a plurality of sub-frames and then outputs a sub-frame satisfying a predetermined condition out of the plurality of sub-frames as a signal for configuring a single frame.

11 Claims, 5 Drawing Sheets

(56) References Cited

U.S. PATENT DOCUMENTS

2019/0304073 A1\* 10/2019 McElvain ................. G06T 5/20
2020/0213564 A1   7/2020 Onishi
2021/0227168 A1\*  7/2021 Inada ................... H04N 5/3765

\* cited by examiner

IMAGING DEVICE, ELECTRONIC DEVICE, AND IMAGE GENERATION DEVICE

BACKGROUND OF THE INVENTION

Field of the Invention

The present invention relates to an imaging device, an electronic device, and an image generation device.

Description of the Related Art

There has been a demand for expanding the dynamic range of imaging devices using photoelectric conversion elements such as CMOS image sensors. Japanese Patent Laid-Open No. 2003-259234 describes an improvement in dynamic range achieved through integration of images of a plurality of frames, obtained from pixels in an image sensor, with a DSP integration memory provided outside the image sensor.

SUMMARY OF THE INVENTION

According to Japanese Patent Laid-Open No. 2003-259234, the improvement in dynamic range can be achieved, but the image quality might be degraded due to luminance unevenness, color inconsistency, and the like occurring in the generated image when there is a frame including saturated pixels.

Some embodiments of the present invention provide an advantageous technique for an imaging device in terms of improvement in dynamic range as well as improvement in image quality.

According to some embodiments, an imaging device comprising: an imaging unit in which a plurality of pixels each including a photoelectric conversion element are arranged; a signal processor configured to process a signal output from the imaging unit; and a storage device configured to store the signal output from the imaging unit and transfer the signal to the signal processor, wherein the storage device stores a plurality of image signals output by the plurality of pixels arranged in the imaging unit as a plurality of sub-frames and then outputs a sub-frame satisfying a predetermined condition out of the plurality of sub-frames as a signal for configuring a single frame, is provided.

According to some other embodiments, an image generation device configured to generate image data from a signal output from an imaging unit in which a plurality of pixels each including a photoelectric conversion element are arranged, wherein the image generation device acquires, from the imaging device, a plurality of image signals that include respective pixel values of the plurality of respective pixels, and generates single image data based on an image signal, in which pixel values of each pixel configuring each image signal satisfy a predetermined condition, out of the plurality of image signals, is provided.

Further features of the present invention will become apparent from the following description of exemplary embodiments (with reference to the attached drawings).

DESCRIPTION OF THE EMBODIMENTS

Figure 1:
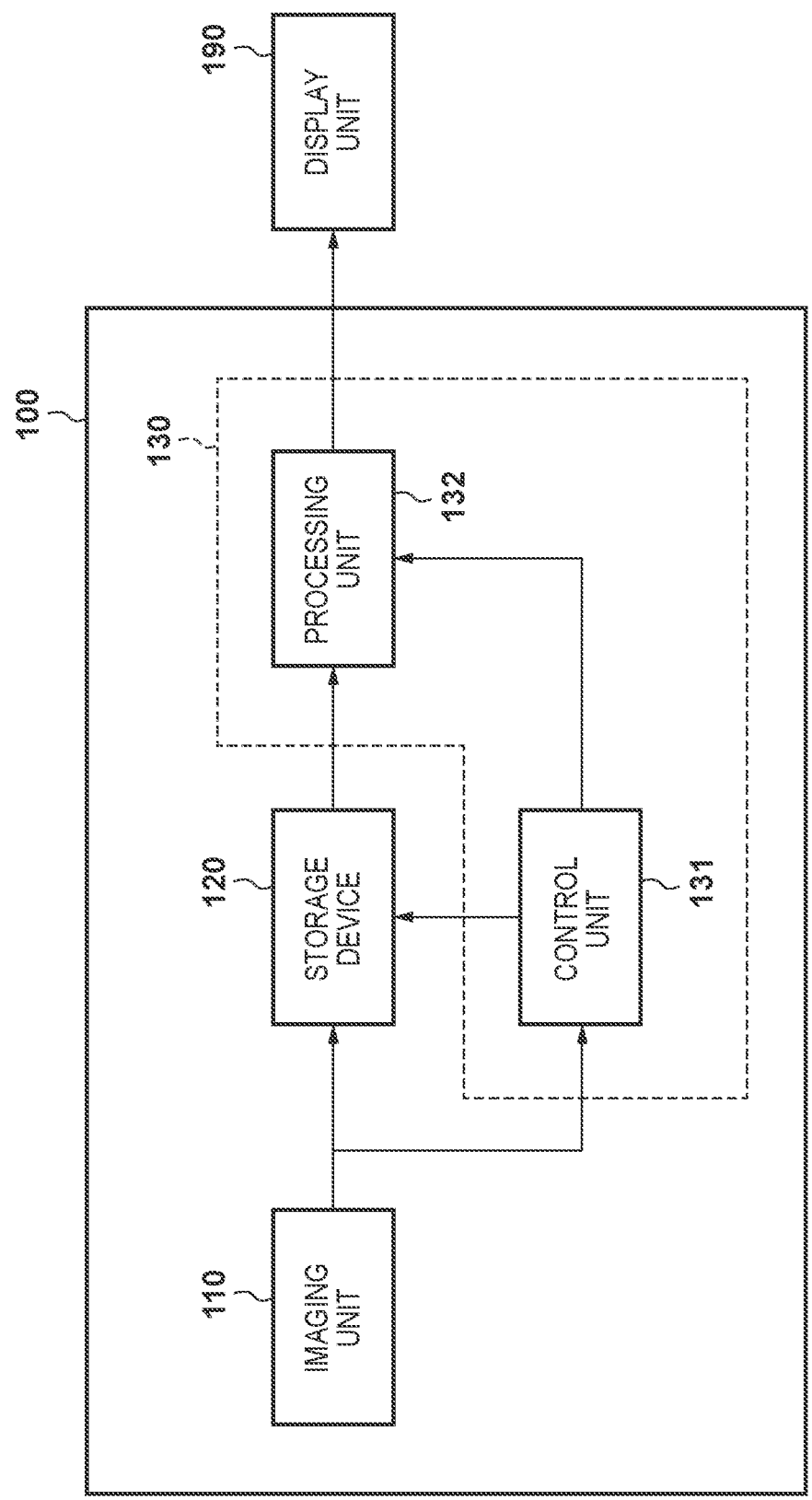
FIG. 1 is a block diagram illustrating a schematic configuration of an imaging device of the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An imaging device of an embodiment of the present disclosure will be described with reference to FIGS. 1 to 5. FIG. 1 is a block diagram illustrating a schematic configuration example of an imaging device 100 of the present embodiment. As illustrated in FIG. 1, the imaging device 100 includes an imaging unit 110, a storage device 120, and a signal processor 130.

In the imaging unit 110, a plurality of pixels each including a photoelectric conversion element are arranged in a form of a two-dimensional array in plan view. The term plan view indicates a view in a direction perpendicular to a light incident surface of a substrate described later. The term cross section indicates a plane perpendicular to the light incident surface of the substrate. Note that when the light incident surface of the substrate is a rough surface as in a microscopic view, the plan view is defined with reference to the light incident surface of the substrate in a macroscopic view. In the imaging unit 110, light incident on each pixel is converted into an electrical signal corresponding to the amount of the incident light. For example, the imaging unit 110 may be a CMOS image sensor including a MOS transistor. For example, the imaging unit 110 includes an analog-to-digital (A/D) conversion circuit, and may convert an analog signal, generated by the photoelectric conversion element arranged in each pixel, into a digital signal and output the digital signal.

The storage device 120 stores an image signal output from the imaging unit 110. Specifically, the image signal is stored that includes pixel values of the plurality of respective pixels arranged in the imaging unit 110. The storage device 120 transfers the stored image signal to the signal processor 130. The storage device 120 in the present embodiment may be a memory such as a dynamic random access memory (DRAM) that accumulates data of the image signal generated by the imaging unit 110.

In the configuration illustrated in FIG. 1, the signal processor 130 generates image data from the signal output from the imaging unit 110. The signal processor 130 includes a control unit 131 and a processing unit 132. The control unit 131 performs control for writing the image signal to the DRAM configuring the storage device 120, and reading the signal written to the storage device 120 into the processing unit 132. The control unit 131 controls the processing unit 132. Under the control by the control unit 131, the processing unit 132 performs arithmetic processing such as adding, averaging, dividing, bit shifting (bit extending), and the like using a plurality of image signals, temporarily stored in the storage device 120, to generate single image data from the plurality of image signals. More specifically, the processing unit 132 executes high-dynamic-range rendering (HDR) processing to generate image data for displaying. The image data generated by the imaging device 100 may be output from the imaging device 100 and displayed on a display unit 190, for example, as illustrated in FIG. 1. The generation of the image data by the processing unit 132 is not essential. Any configuration may be employed as long as data (image signal, for example) with which an image can be displayed on the display unit 190 is output from the processing unit 132.

Figure 2:
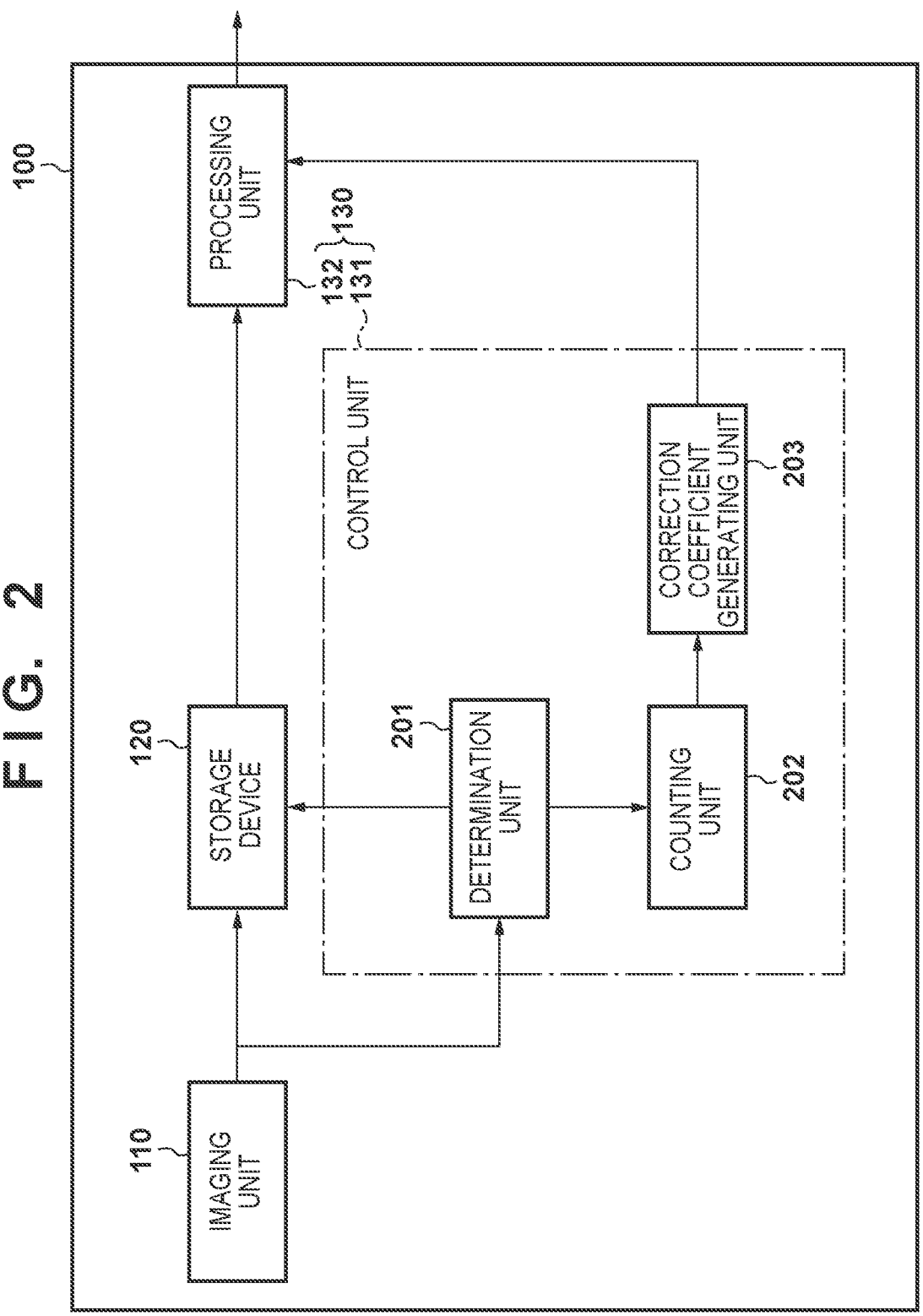
FIG. 2 is a block diagram illustrating a schematic configuration of a signal processor of the imaging device of the present embodiment.

Next, the HDR processing and the image data output will be described using FIG. 1 and FIG. 2. FIG. 2 is a block diagram illustrating a schematic configuration example of the control unit 131 of the signal processor 130. The HDR processing is processing of synthesizing a plurality of image signals including the respective pixel values output from the respective pixels of the imaging unit 110, to obtain gradation characteristics better than the gradation characteristics that would be obtained through single image capturing. In the following description, for the sake of simplicity of the description and example arithmetic expressions, an example will be given where N image signals of the same gradation number are used for addition and synthesis of single image data. However, the present disclosure is not limited to this, and can also be applied to a case where a plurality of image signals different from each other in imaging conditions are synthesized. In such a case, arithmetic operations may be performed with an arithmetic expression for performing HDR rendering weighted as appropriate depending on the imaging conditions and the like.

First of all, when the imaging starts, an image signal including pixel values of the plurality of respective pixels arranged in the imaging unit 110 is output from the imaging unit 110 to the storage device 120. The control unit 131 of the signal processor 130 counts the number of image signals stored in the storage device 120, accumulates the image signals for N times (N is an integer equal to or larger than two), and then outputs single image data at once from the processing unit 132. Specifically, the storage device 120 stores and accumulates the image signals for N frames as N sub-frames, and outputs the signals to the processing unit 132 as signals configuring a single frame (image). A single frame can be generated, for example, from image signals obtained from a plurality of pixels arranged in the imaging unit 110. Specifically, a single frame can be generated from image signals from a first row of pixels to a final row of pixels among the plurality of pixels. With accumulating the image signals for N times, the number of bits of image data (each signal in a single frame) becomes larger than the number of bits of each signal of the plurality of image signals. Specifically, even in a case where the capacitance value of the pixels arranged in the imaging unit 110 is small and the signal value is likely to saturate, it is possible to increase the dynamic range of the obtained image data for the number of the plurality of image signals.

However, in each image signal, saturated pixels may exist that have saturated with pixel values exceeding a predetermined threshold. The predetermined threshold is, for example, a value that exceeds the saturation capacity of the photoelectric conversion element arranged in a pixel. When a plurality of image signals including an output from saturated pixels are synthesized into single image data, the image quality may deteriorate. For example, when the imaging device includes a color filter that transmits light of a plurality of different colors, and the photoelectric conversion element performs photoelectric conversion of the light transmitted through the color filter, a color shift may occur. For example, in an electronic camera installed outdoors, such as a street camera, the brightness of fluorescent lamps and LED illumination such as traffic lights may change randomly due to a flickering phenomenon, which causes variation in luminance from frame to frame, and the like. Thus, even if the imaging conditions are adjusted in advance, an image signal including saturated pixel values may be generated.

Therefore, in the present embodiment, the control unit 131 of the signal processor 130 determines whether the pixel values of the respective pixels configuring the respective image signals (sub-frames) have exceeded the predetermined threshold and reached saturation when the image signals are accumulated in the storage device 120. For example, as illustrated in FIG. 2, the control unit 131 may include a determination unit 201 that determines whether the pixel values of the respective pixels configuring the image signals have exceeded the predetermined threshold and reached saturation. Furthermore, at this time, the control unit 131 of the signal processor 130 counts the number of image signals (here, M signals) including pixel values output from saturated pixels, or the number of image signals (N−M signals) that do not include saturated pixel values exceeding the threshold. For example, as illustrated in FIG. 2, the control unit 131 may include a counting unit 202 that counts the number of these image signals. Furthermore, the control unit 131 of the signal processor 130 generates a correction coefficient based on the number of image signals including pixel values output from saturated pixels out of the plurality of image signals, or the number of image signals that do not include saturated pixel values. For example, as illustrated in FIG. 2, the control unit 131 may include a correction coefficient generating unit 203 for generating the correction coefficient. In the present embodiment, the correction coefficient may be $\{N/(N-M)\}$.

Next, the processing unit 132 of the signal processor 130 corrects the image signals that do not include saturated pixel values out of the plurality of image signals according to the correction coefficient, and generates a signal for configuring a single frame. For example, the processing unit 132 generates single image data that may be data for an image for display on the display unit 190. For example, the processing unit 132 performs an arithmetic operation including addition of image signals that do not include saturated pixel values temporarily stored in the storage device 120 and multiplication by the correction coefficient $\{N/(N-M)\}$. Accordingly, in the processing of obtaining image data with the number of bits being N times by adding image signals for N times, correction is made to prevent the number of bits from remaining at the number of bits being (N−M) times by excluding the image signals including the saturated pixel values from addition.

Through the processing described above, even in a case where the capacitance of the pixels arranged in the imaging unit 110 is small, the number of bits of the image data obtained can be increased by imaging for N times. In addition, by not using image signals including saturated pixel values for HDR rendering, image data without color shifts or the like can be acquired. As a result, in the present embodiment, the imaging device 100 that achieves both improved dynamic range and improved image quality can be obtained.

In the foregoing, it has been described that image signals including pixel values output from saturated pixels are not used for HDR rendering. In other words, depending on whether one or more saturated pixels exist out of the plurality of pixels in image signals, the determination unit 201 of the signal processor 130 determines whether the image signals are to be excluded from the HDR rendering. However, this should not be construed in a limiting sense. It suffices if the signal processor 130 generates single image data based on an image signal satisfying a predetermined condition with pixel values of respective pixels configuring each image signal out of the plurality of image signals including respective pixel values of the plurality of respective pixels output by the imaging unit 110.

For example, the determination unit 201 of the signal processor 130 may determine whether the number of saturated pixels with the pixel values exceeding the predetermined threshold is equal to or smaller than a predetermined number for each of the plurality of image signals. It suffices if the number of outputs from the saturated pixels included in the image signals used in the HDR rendering is set as appropriate in accordance with the specifications of the imaging device 100. In this case, the processing unit 132 of the signal processor 130 may generate single image data based on an image signal with the number of saturated pixels equal to or smaller than the predetermined number out of the plurality of image signals. Also in this case, the correction coefficient generating unit 203 of the signal processor 130 may generate the correction coefficient based on the number of image signals with the number of saturated pixels equal to or smaller than the predetermined number (or exceeding the predetermined number) out of the plurality of image signals. Furthermore, the processing unit 132 of the signal processor 130 may correct image signals with the number of saturated pixels equal to or smaller than the predetermined number (or exceeding the predetermined number) out of the plurality of image signals according to the correction coefficient, and generate single image data.

The determination on whether the pixel values are saturated may be made by setting any output value of the pixel values of the respective pixels included in an image signal as a threshold. The plurality of pixels arranged in the imaging unit 110 may include a plurality of pixel groups having sensitivity to light in different wavelength bands from each other (for example, an R pixel group having sensitivity to the red wavelength range, a G pixel group having sensitivity to the green wavelength range, and a B pixel group having sensitivity to the blue wavelength range). In accordance with the specifications of the imaging device 100, thresholds to determine whether pixel values are saturated may be set individually, such as for each pixel color, for each output channel, or the like. That is, the thresholds to determine whether pixel values are saturated may differ for each pixel group of the plurality of pixel groups (for example, the R pixel group, the G pixel group, and the B pixel group).

In the above-described embodiment, it has been described that image quality is improved by not using image signals including saturated pixel values. However, this should not be construed in a limiting sense. For example, the pixel values of saturated pixels may be corrected based on a pixel value of a pixel adjacent to the saturated pixels out of the plurality of pixels arranged in the imaging unit 110, and single image data may be generated based on image signals that do not include saturated pixels and the image signals in which the pixel values of the saturated pixels are corrected. For example, a case is given in which pixels included in the R pixel group are saturated in image signals acquired from the imaging unit 110 configured to include the R pixel group, the G pixel group, and the B pixel group. In this case, the relative ratio of outputs for the respective colors may be determined from the RGB outputs of image signals that do not include saturated pixels, and the outputs of the pixels having saturated pixel values may be estimated to be corrected from the outputs of G pixels or B pixels adjacent to the saturated pixels. That is, the signal processor 130 (for example, the correction coefficient generating unit 203) may correct the signal value of the saturated pixels based on the pixel values of pixels in the pixel group (the G pixel group or the B pixel group) different from the pixel group including the saturated pixels (the R pixel group) out of the plurality of pixel groups. Furthermore, the position (coordinates, areas, and the like) in the image signals may be determined based on predetermined conditions, and correction may be made based on the position.

In the present embodiment, to hold the number of bits for the number of times image signals have been acquired, the processing is performed in which data obtained by adding the image signals for (N−M) times is multiplied by the correction coefficient {N/(N−M)}. Alternatively, it suffices if image signals including the pixel values output from the saturated pixels are excluded. For example, an appropriate weight coefficient may be added to the correction coefficient (N/(N−M)) to make outputs appropriate for the dynamic range. In this case, the weight coefficient may be generated with reference to pixel values other than saturated pixels of image signals including pixel values output from the saturated pixels, or the weight coefficient may be generated by providing a dedicated detection unit for detecting the amount of incident light on pixels. It suffices if an appropriate weight is applied to the image data after a plurality of image signals are added.

In the present embodiment, it has been described that the DRAM is used as the storage device 120. However, this should not be construed in a limiting sense. As long as the above-described processing can be performed at high speed, appropriate storage devices such as a volatile memory, a non-volatile memory, and the like may be used. In addition, the DRAM may be used as the storage device 120, and the image data output from the imaging device 100 may be stored (recorded) in a non-volatile memory such as a hard disk or a flash memory.

Furthermore, the functions of the above-described arithmetic processing may be shared by any block as long as the processing is executable by the storage device 120 and the signal processor 130 including the control unit 131 and the processing unit 132. In the present embodiment, the control unit 131 performs processing such as controlling write/read in the storage device 120, counting the number of image signals output from the imaging unit 110, determining whether the pixel values are equal to or smaller than a threshold (determination of saturation), excluding image signals including pixel values output from saturated pixels, and generating the correction coefficient, but this is not construed in a limiting sense. These functions may be performed separately or in a configuration in a suitable combination. Alternatively, for example, the arithmetic processing described to be performed by the processing unit 132 may be executed by the control unit 131.

Arrangement examples of each configuration of the imaging device 100 of the present embodiment will be described using FIGS. 3A to 3C. To synthesize a plurality of image signals and generate single image data as described above, high-speed processing is required for maintaining the speed at which image data is generated, such as imaging of moving images. For this purpose, the imaging device 100 may include a semiconductor chip having a stacked structure in which a wiring pattern length for transferring various signals can be shortened. The semiconductor chip having a stacked structure has a structure in which a plurality of semiconductor layers are stacked with a wiring layer therebetween. By disposing the imaging unit 110 and the signal processor 130 in one semiconductor chip configured with a stacked structure, high-speed image processing may be achieved. Note that all of the configurations of the imaging unit 110, the storage device 120, and the signal processor 130 need not be arranged in one semiconductor chip. For example, as described later, a possible configuration may include a substrate in which the storage device 120 is arranged and a substrate including the imaging unit 110 that are not stacked.

For example, when the imaging device 100 has the configuration illustrated in FIG. 1, the configuration illustrated in FIG. 3A and the configuration illustrated in FIG. 3C can be employed. FIG. 3A discloses the imaging device 100 including a substrate 410 and a substrate 420 that are arranged in a stacked manner. The substrate 410 includes the imaging unit 110, and the substrate 420 includes the signal processor 130 and the storage device 120. In this case, light may be incident from the side of the substrate 410 side (the upper side in FIG. 3A). Note that the incident side of light is the same in the configurations of FIGS. 3B and 3C. Furthermore, the substrates 410 and 420 each include a silicon or other semiconductor substrate, and a wiring part including a wiring pattern and an interlayer insulating layer.

Furthermore, as illustrated in FIG. 3C, for example, the imaging device 100 may include the substrate 410, the substrate 420, and a substrate 430 that are arranged in a stacked manner. In this case, for example, the substrate 410 includes the imaging unit 110, the substrate 430 includes the storage device 120, and the substrate 420 includes the signal processor 130. The substrate 430 is arranged between the substrate 410 and the substrate 420. Note that the substrate 420 and the substrate 430 may be stacked in place of each other. In other words, the substrate 420 including the signal processor 130 may be arranged between the substrate 430 including the storage device 120 and the substrate 410.

Figure 3:
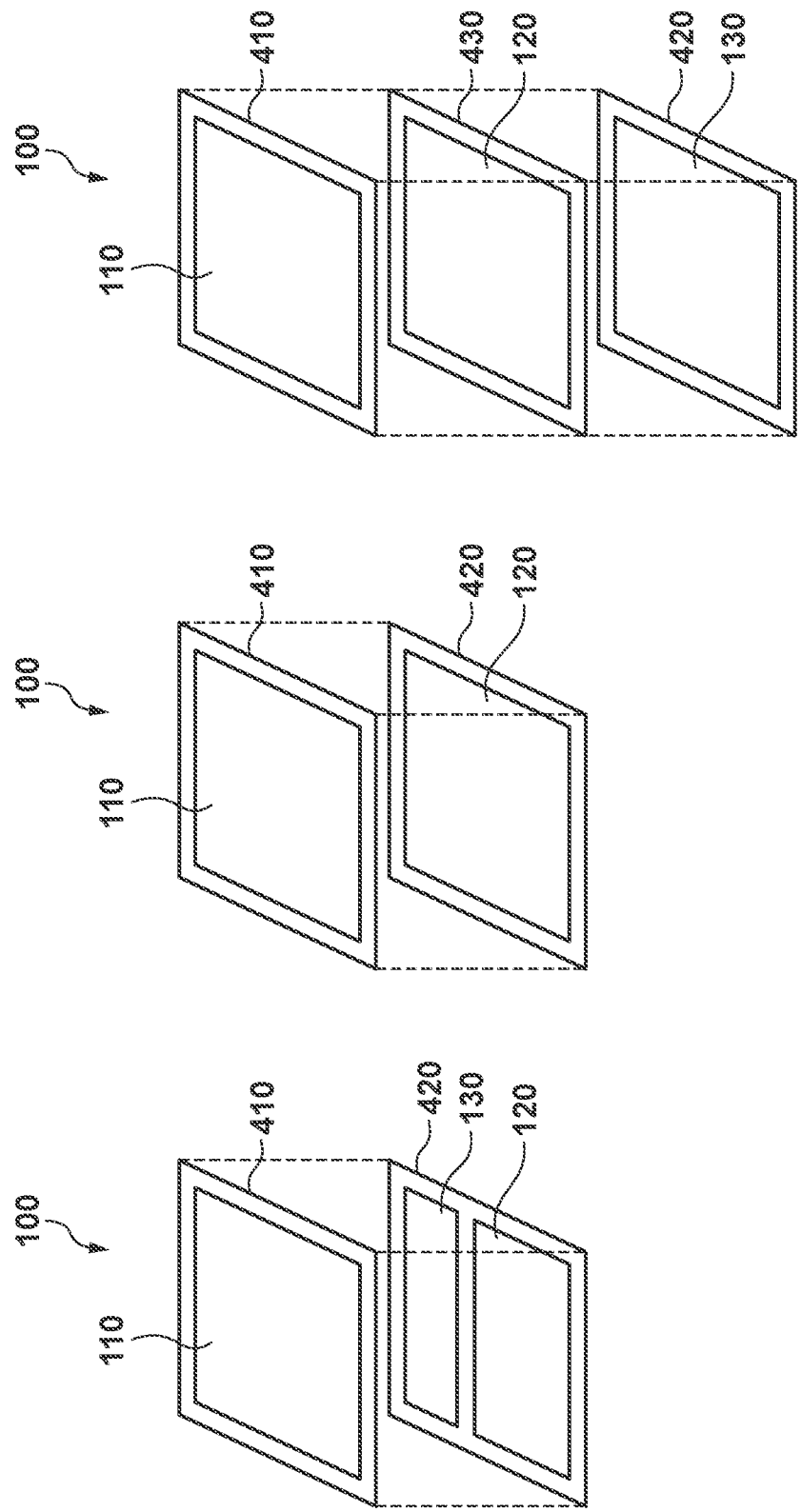
FIGS. 3A to 3C are diagrams illustrating arrangement examples of each configuration of the imaging device according to the present embodiment.
Figure 4:
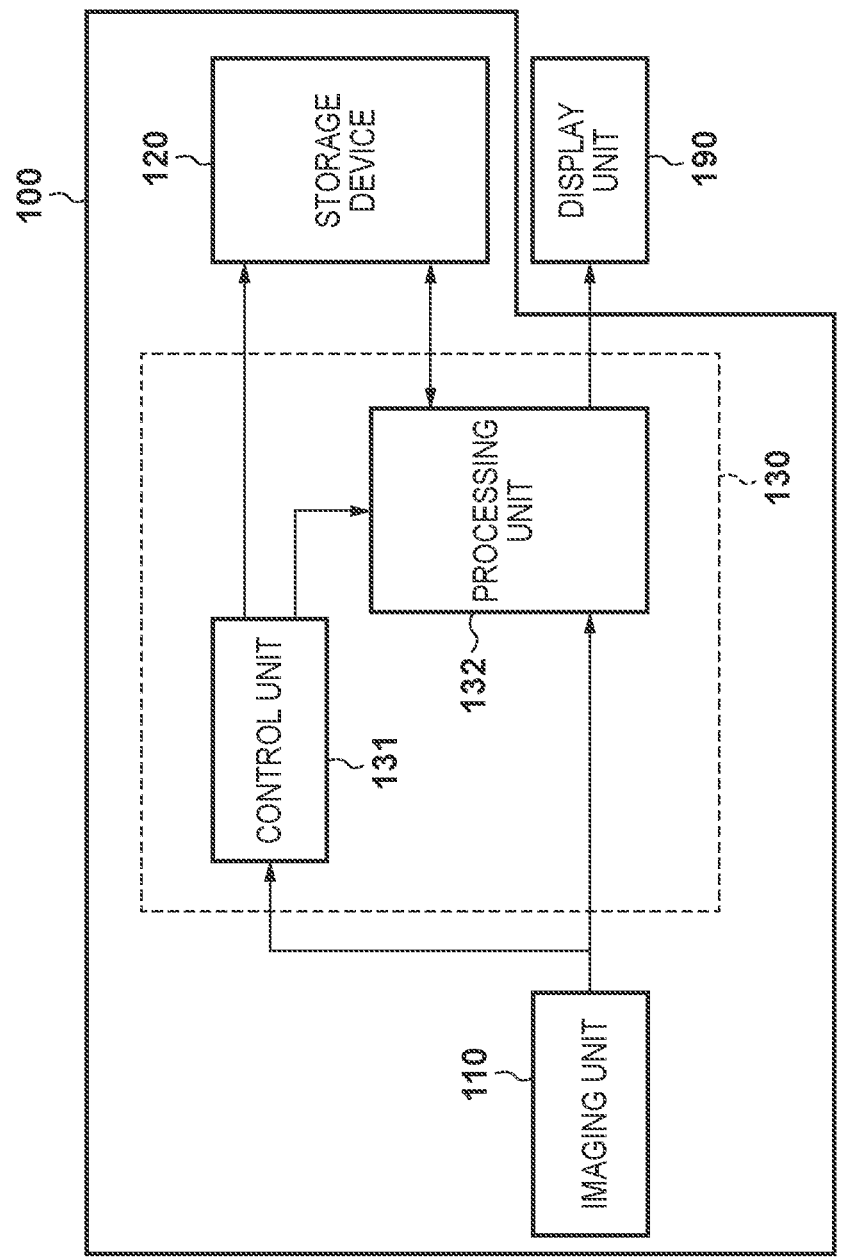
FIG. 4 is a block diagram illustrating a schematic configuration of the imaging device of the present embodiment.

For example, when the imaging device 100 has a configuration as illustrated in FIG. 4, the substrate 410 includes the imaging unit 110 and the substrate 420 includes the signal processor 130 as illustrated in FIG. 3B. In this case, as described above, the storage device 120 is arranged in a different semiconductor chip. The semiconductor chip in which the substrate 410 and the substrate 420 are stacked and the semiconductor chip in which the storage device 120 is arranged may be arranged in the same semiconductor package, for example.

When the imaging device 100 is a stacked chip, each of the configurations as illustrated in FIGS. 3A to 3C may not be complete on one substrate. For example, in the configuration illustrated in FIG. 3A, the storage device 120 may be arranged in both the substrate 410 and the substrate 420. For example, in the configuration illustrated in FIG. 3C, the signal processor 130 may be arranged in the substrate 420 and the substrate 430. In this case, for example, the substrate 420 may be equipped with the functions of the control unit 131 of the signal processor 130, whereas the substrate 430 may be equipped with the functions of the processing unit 132 of the signal processor 130. It suffices if appropriate arrangements are selected in accordance with the respective specifications required for the imaging device 100.

When such a configuration that the substrate in which the storage device 120 is arranged is stacked with the substrate in which the imaging unit 110 is arranged as illustrated in FIGS. 3B and 4 is not employed, the number of wiring lines between the imaging unit 110 and the storage device 120 may become larger and the circuit design may become more complicated than in a case where each of the substrates are stacked. However, by not stacking the substrate including the storage device 120 and the substrate including the imaging unit 110, the use of the storage device 120 with a larger capacity may become possible. As a result, the number of image signals that can be used to expand the dynamic range increases, whereby an image with a larger dynamic range and improved image quality can be obtained.

In the above-described embodiment, the imaging device 100 in which the signal processor 130 performs HDR rendering on the image signals imaged by the imaging unit 110 has been described, but the present disclosure is not limited thereto. For example, the signal processor 130 may be used alone. In other words, the signal processor 130 (which may also be referred to as an image generation device) may receive an image signal from an imaging unit arranged in an imaging device other than the imaging device 100, whereby the signal processor 130 may perform HDR rendering to generate image data. Furthermore, each step of a method for generating the image data described above may be performed by a computer or the like arranged outside the imaging device 100.

Figure 5:
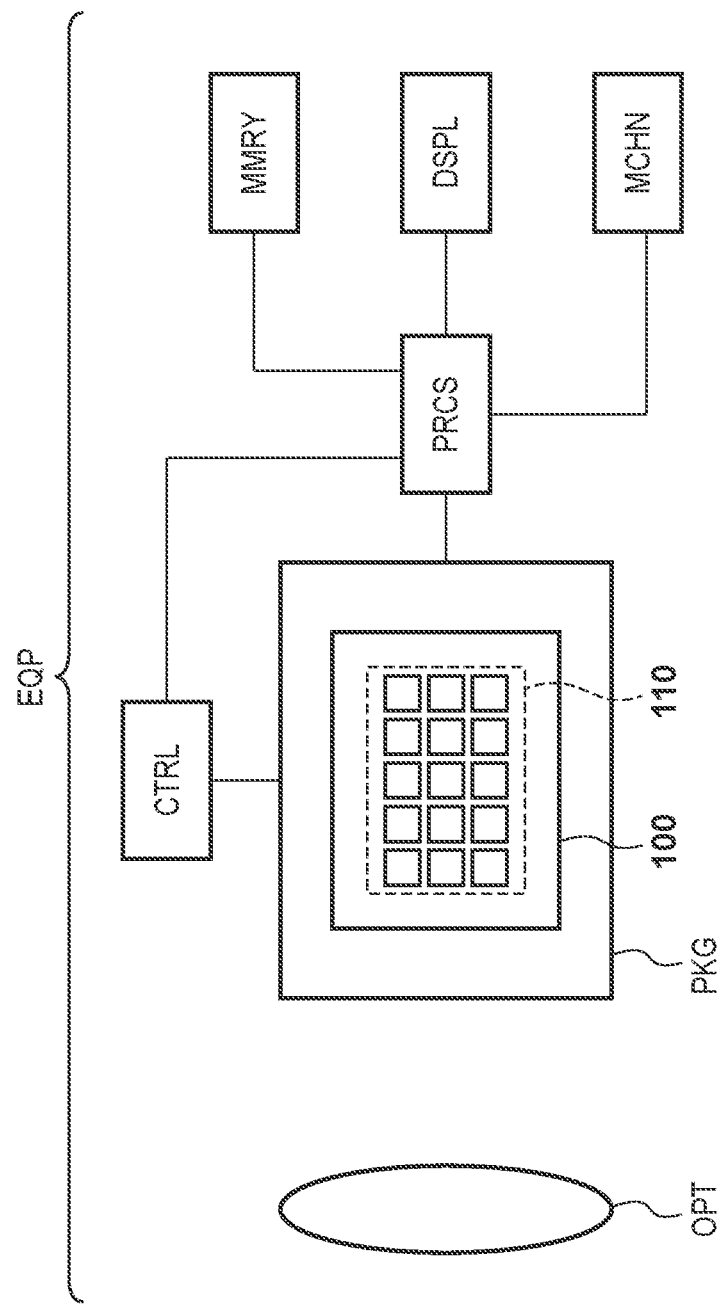
FIG. 5 is a diagram illustrating a configuration example of a camera incorporating the imaging device of the present embodiment.

An application example of the imaging device 100 according to the above-described embodiment will be described below. FIG. 5 is a schematic diagram of an electronic device EQP equipped with the imaging device 100. FIG. 5 illustrates a camera as an example of the electronic device EQP. Here, the concept of a camera includes not only an apparatus whose main purpose is imaging, but also an apparatus (for example, a personal computer, a mobile terminal such as a smartphone) that has an imaging function supplementarily.

The imaging device 100 may be a semiconductor chip having a stacked structure provided with the imaging unit 110. The imaging device 100 is accommodated in a semiconductor package PKG, as illustrated in FIG. 5. If the imaging device 100 has a configuration as illustrated in FIG. 3, the storage device 120 may be arranged within this semiconductor package PKG. The package PKG may include a base to which the imaging device 100 is fixed, a lid member made of glass or the like facing the imaging device 100, and a conductive connecting member such as a bonding wire and a bump that connects a terminal provided to the base and a terminal provided to the imaging device 100. The device EQP may further include at least one of an optical system OPT, a control device CTRL, a processing device PRCS, a display device DSPL, and a storage device MMRY.

The optical system OPT focuses an image on the imaging device 100, and may be a lens, a shutter, or a mirror, for example. The control device CTRL controls the operation of the imaging device 100, and may be a semiconductor device such as an ASIC, for example. The processing device PRCS processes a signal output from the imaging device 100, and may be a semiconductor device such as a CPU or an ASIC. The display device DSPL may be an EL display device or a liquid crystal display device that displays image data obtained by performing the above-described HDR rendering by the imaging device 100. The storage device MMRY is a magnetic device or a semiconductor device that stores image data that is obtained by the imaging device 100 and on which HDR rendering is performed. The storage device MMRY may be a volatile memory such as an SRAM or a DRAM, or a non-volatile memory such as a flash memory or a hard disk drive. A mechanical device MCHN includes a movable part or a propulsion part such as a motor or an engine. The mechanical device MCHN in a camera can drive components of the optical system OPT for zooming, focusing, and shuttering operations. In the device EQP, image data output from the imaging device 100 is displayed on the display device DSPL or transmitted to the outside by a communication device (not illustrated) provided in the device EQP. Thus, the device EQP may further include the storage device MMRY and the processing device PRCS, besides a storage circuit unit and an arithmetic circuit unit included in the signal processor 130, the storage device 120, and the like included in the imaging device 100.

The camera incorporating the imaging device 100 may be applied to monitoring cameras and on-vehicle cameras installed in automobiles, railway vehicles, ships, aircrafts, and transport devices such as industrial robots. In addition, the camera incorporating the imaging device 100 is not limited to the applications related to transport devices, and is applicable to a wide range of devices utilizing object recognition such as an intelligent transport system (ITS).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-010625, filed Jan. 26, 2021, which is hereby incorporated by reference herein in its entirety.

What is claimed is:

1. An imaging device comprising:
    an imaging unit in which a plurality of pixels each including a photoelectric conversion element are arranged;
    a signal processor configured to process an image signal output from the imaging unit; and
    a storage device configured to store the image signal output from the imaging unit and to transfer the image signal to the signal processor,
    wherein the storage device is configured to store a plurality of image signals output from the imaging unit as a plurality of sub-frames, and
    wherein the signal processor is configured to: (1) determine whether a number of saturated pixels with pixel values exceeding a predetermined threshold is equal to or smaller than a predetermined number for each sub-frame, (2) select, from the plurality of sub-frames stored in the storage device, sub-frames in which the number of the saturated pixels is equal to or smaller than the predetermined number, and (3) generate a single frame using the selected sub-frames.

2. The imaging device according to claim 1, wherein the signal processor is further configured to:
    generate a correction coefficient based on a number of the selected sub-frames, in which the number of the saturated pixels is equal to or smaller than the predetermined number; and
    correct the selected sub-frames in accordance with the correction coefficient.

3. The imaging device according to claim 1, wherein the plurality of pixels include a plurality of pixel groups having sensitivity to light in different wavelength bands from each other, and
    wherein the signal processor determines whether the number of the saturated pixels is equal to or smaller than the predetermined number for each pixel group out of the plurality of pixel groups, for each of the plurality of image signals.

4. The imaging device according to claim 3, wherein the threshold differs for each pixel group out of the plurality of pixel groups.

5. The imaging device according to claim 1, wherein the signal processor:
    determines whether a saturated pixel with a pixel value exceeding a predetermined threshold exists for each of the plurality of image signals;
    corrects the pixel value of the saturated pixel based on a pixel value of a pixel adjacent to the saturated pixel out of the plurality of pixels; and
    generates data of the single frame based on (a) an image signal that does not include the saturated pixel out of the plurality of image signals and (b) an image signal with the pixel value of the saturated pixel corrected out of the plurality of image signals.

6. The imaging device according to claim 5, wherein the plurality of pixels include a plurality of pixel groups having sensitivity to light in different wavelength bands from each other, and
    wherein the signal processor corrects a signal value of the saturated pixel based on a pixel value of pixels in a pixel group different from a pixel group including the saturated pixel out of the plurality of pixel groups.

7. The imaging device according to claim 1, further comprising a first substrate and a second substrate that are arranged in a stacked manner,
    wherein the first substrate includes the imaging unit, and wherein the second substrate includes the signal processor.

8. The imaging device according to claim 7, wherein the second substrate includes the storage device.

9. The imaging device according to claim 7, further comprising a third substrate that is arranged in a stacked manner with the first substrate,
wherein the third substrate includes the storage device.

10. The imaging device according to claim 1, wherein a number of bits of each signal in the single frame is larger than a number of bits of each signal of the plurality of image signals.

11. An electronic device comprising:
the imaging device according to claim 1; and
a control device configured to control an operation of the imaging device.

* * * * *